US005542579A

United States Patent [19]
Robbins, III

[11] Patent Number: 5,542,579
[45] Date of Patent: *Aug. 6, 1996

[54] DISPENSING CAP WITH INTERNAL MEASURING CHAMBER AND SELECTIVELY USEABLE SIFTER

[76] Inventor: Edward S. Robbins, III, 2802 E. Avalon Ave., Muscle Shoals, Ala. 35661

[ * ] Notice: The term of this patent shall not extend beyond the expiration date of Pat. No. 5,487,494.

[21] Appl. No.: 352,104

[22] Filed: Nov. 30, 1994

Related U.S. Application Data

[63] Continuation-in-part of Ser. No. 220,530, Mar. 31, 1994, Pat. No. 5,487,494, which is a continuation-in-part of Ser. No. 288,896, Aug. 10, 1994, Pat. No. 5,509,582, which is a continuation of Ser. No. 47,086, Apr. 16, 1993, abandoned, which is a continuation-in-part of Ser. No. 237,336, May 3, 1994, Pat. No. 5,465,871, which is a continuation of Ser. No. 979,042, Nov. 19, 1992, abandoned.

[51] Int. Cl.[6] .................................................... B67D 5/38
[52] U.S. Cl. ................... 222/158; 222/189.02; 222/456; 222/481
[58] Field of Search .............................. 222/142.1, 142.4, 222/154, 156, 157, 158, 189.02, 189.03, 189.05, 424.5, 425, 454, 456, 480, 481

[56] References Cited

U.S. PATENT DOCUMENTS

| | | | |
|---|---|---|---|
| 1,273,012 | 7/1918 | Souther | 222/456 |
| 1,714,368 | 5/1929 | Hobson . | |
| 1,802,284 | 4/1931 | Stoddard | 222/572 X |
| 2,214,437 | 9/1940 | Punte et al. | 206/42 |
| 2,339,644 | 1/1944 | Lucas | 222/425 |
| 2,370,820 | 3/1945 | Stott | 222/456 |
| 2,449,285 | 9/1948 | Ekstrom | 220/253 X |
| 2,804,103 | 8/1957 | Wall | 141/381 |
| 2,811,281 | 10/1957 | Donovan | 222/154 X |
| 2,840,124 | 6/1958 | Greene | 222/212 X |
| 2,844,266 | 7/1958 | Hofe | 215/244 |
| 2,969,167 | 1/1961 | Libit | 222/512 |
| 2,985,343 | 5/1961 | Mask | 222/442 |
| 3,020,659 | 2/1962 | Paulini | 40/307 |
| 3,033,420 | 5/1962 | Thomas et al. | 222/1 |
| 3,140,799 | 7/1964 | Mehr | 222/131 |
| 3,424,355 | 1/1969 | Blumen | 222/450 |
| 3,486,665 | 12/1969 | La Croce | 220/254 X |
| 3,512,861 | 5/1970 | Frankel | 222/158 |
| 3,784,884 | 3/1957 | Borie, Jr. | 222/336 |
| 3,860,111 | 1/1975 | Thompson | 206/534 |
| 3,948,105 | 4/1976 | Johnson, Jr. | 73/427 |
| 4,069,935 | 1/1978 | Hampel | 220/377 |
| 4,079,859 | 3/1978 | Jennings | 222/454 X |
| 4,083,467 | 4/1978 | Mullins et al. | 222/548 X |
| 4,144,989 | 3/1979 | Joy | 222/438 |
| 4,164,301 | 8/1979 | Thayer | 220/253 |
| 4,209,100 | 6/1980 | Uhlig | 215/216 |
| 4,292,846 | 10/1981 | Barnett | 73/427 |
| 4,298,038 | 11/1981 | Jennings | 141/2 |
| 4,318,500 | 3/1982 | Melikian | 222/425 |
| 4,346,823 | 8/1982 | Eppenbach | 222/443 |

(List continued on next page.)

FOREIGN PATENT DOCUMENTS

| | | |
|---|---|---|
| 580339 | 8/1958 | Italy . |
| 613958 | 12/1960 | Italy . |

*Primary Examiner*—Joseph A. Kaufman
*Attorney, Agent, or Firm*—Nixon & Vanderhye P.C.

[57] ABSTRACT

A measuring/dispensing cap adapted for attachment to an open, upper end of a container includes a lid and a peripheral skirt extending downwardly from the lid. An integrally fixed sifter panel separates the peripheral skirt into upper and lower sections, the upper section including a measuring chamber and the lower section including screw threads for attaching the cap to the open upper end of the container. The sifter panel is formed to provide a flow opening on one side of a horizontal centerline extending across the cap, the flow opening defined in part by a first edge extending parallel to and spaced from the horizontal centerline. The lid is pivotally secured to the skirt and has a hinge axis parallel to the centerline and the first edge. A rotatable weir dam panel overlies the sifter panel, and the weir dam panel has a second weir edge which may be aligned with the first edge to enable substantially free flow of container contents through the cap and into the measuring chamber.

15 Claims, 5 Drawing Sheets

U.S. PATENT DOCUMENTS

| | | | |
|---|---|---|---|
| 4,376,497 | 3/1983 | Mumford | 222/153 |
| 4,399,928 | 8/1983 | Klingler | 220/335 |
| 4,544,063 | 10/1985 | Neward | 206/540 |
| 4,580,687 | 4/1986 | Lewis | 222/556 X |
| 4,606,481 | 4/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,646,948 | 3/1987 | Jennings | 222/454 |
| 4,691,821 | 9/1987 | Hofmann | 206/216 |
| 4,693,399 | 9/1987 | Hickman et al. | 220/254 X |
| 4,714,181 | 12/1987 | Kozlowski et al. | 222/480 |
| 4,723,693 | 2/1988 | DeCoster | 222/483 |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,139,181 | 8/1992 | VerWeyst | 222/480 |
| 5,292,039 | 3/1994 | Neofitou | 222/158 X |

DISPENSING CAP WITH INTERNAL MEASURING CHAMBER AND SELECTIVELY USEABLE SIFTER

RELATED APPLICATIONS

This application is a continuation-in-part of commonly owned application Ser. No. 08/220 530, filed Mar. 31, 1994, now U.S. Pat. No. 5,487,494, which is a continuation-in-part of application Ser. No. 08/288,896 filed Aug. 10, 1994, now U.S. Pat. No. 5,509,582, which is a continuation of application Ser. No. 08/047,086, filed Apr. 16, 1993, now abandoned, which in turn, is a continuation-in-part of commonly owned application Ser. No. 08/237,336 filed May 3, 1994, now U.S. Pat. No. 5,465,871, which is a continuation of application Ser. No. 07/979,042 filed Nov. 19, 1992 now abandoned.

BACKGROUND AND SUMMARY OF THE INVENTION

The present invention relates generally to dispensing containers and, more specifically, to dispensing cap constructions enabling accurately measured amounts of the container contents (in granular, particulate or powdered form) to be dispensed from the cap.

Dispensing containers are, of course, well known and are used in many different industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

The present invention eliminates the need for measuring spoons or cups by providing a hollow cap, which serves as its own measuring device, for use with an otherwise conventional container. While the incorporation of a measuring function into a container/cap construction for the discharge of desired amounts of the container contents is not new (see for example, U.S. Pat. Nos. 1,802,284; 2,804,103; 3,860,111; 4,613,057 and 4,635,828), the present invention provides improved and simplified structures for accomplishing this result, while generally retaining the desirable option of substantially unrestricted pouring and/or shaking of the container contents from the dispensing cap.

In addition, the present invention provides a selectively useable sifter within the measuring cap construction. In this continuation-in-part application, the sifter is incorporated as an integral and stationary part of the cap construction. More specifically, a plastic cap is provided which includes a top and a depending skirt. The skirt incorporates an inverted, partial dome-like (or partial upright bowl-shaped) sifter panel which is provided with a plurality of sifter apertures but which is also formed to create a flow opening lying on one side of a horizontal center line extending through the cap. This flow opening is defined by a straight edge or chord on the sifter panel extending between two parts of the annular periphery of the skirt, and is referred to herein sometimes as a chord-shaped opening. The sifter panel, in combination with the skirt wall and the cap top wall, form a measuring chamber into which a desired amount of container contents may be transferred as described further herein. In this exemplary embodiment, the cap top wall forms a fully openable cap lid hinged to the cap skirt. The free edge of the cap, which is diametrically opposed to the integral hinge, lies on the opposite side of the horizontal cap center line from the flow opening.

The cap lid (and optionally a portion of the depending skirt) is provided with volume gradations in the form of level lines and suitable alpha and/or numeric characters, enabling the user to precisely transfer measured amounts of contents from the container into the cap measuring chamber.

A weir dam panel, having a curvature complementary to that of the sifter panel, is snap-fit onto the stationary sifter panel at a location coincident with a vertical center axis of the cap, such that the weir dam panel is rotatable about the vertical center axis, relative to the stationary sifter panel. This weir dam panel is provided with a shape similar to the sifter panel in plan so that a chord-shaped flow opening established by a straight edge or chord of the weir dam panel may be aligned vertically with the similarly shaped flow opening in the sifter panel. In addition, a vertical tab is provided on the weir dam panel which extends upwardly to permit the user to rotate the weir dam panel to either of two operative positions.

The cap as described herein can be used to dispense container contents in any of three dispensing modes. In a first mode, the user rotates the weir dam panel until the weir dam panel flow opening overlies the sitter panel flow opening so that, with the cap lid closed, the user can freely transfer measured amounts of container contents into the measuring chamber. Once a measured amount is transferred to the measuring chamber, the measured amount can be discharged simply by opening the cap lid. Alternatively, in a second mode, the cap lid may remain open so that the user can simply free flow unrestricted amounts of container contents through the cap. In this first weir dam panel position, the sifting apertures of the sifter panel are closed by the solid weir dam panel. In a third mode, the sifter apertures are opened by rotating the weir dam panel 180° to a second operative position, enabling the user to dispense container contents through the sifter apertures and through the open lid, using a typical back and forth shaking motion. In this second operative position of the weir dam panel, the relatively large flow opening in the sifter panel is closed by the solid portion of the weir dam panel.

In the preferred arrangement, the dispensing cap is formed as a three-piece construction, i.e., (1) the depending skirt and the sifter panel are formed as a unit; (2) the weir dam panel; and (3) the cap lid. In an alternative arrangement, the cap lid may be formed integrally with the skirt and hinged by a thinned region (or "living hinge").

All three of the components in accordance with the invention may be made of transparent plastic material to facilitate accurate transfer measured amounts of container contents from the container into the measuring chamber in the cap. On the other hand, the weir dam panel, sifter panel and skirt may be constructed of an opaque plastic material while the lid remains transparent to create an aesthetically pleasing contrast. As already mentioned, volumetric indicators will be provided at least on the lid (and if desired on the cap skirt in the event the latter is made of transparent plastic) to enable the user to more accurately transfer measured amounts to the cap measuring chamber.

Thus, in its broader aspects, the present invention relates to a measuring/dispensing cap adapted for attachment to an open upper end of a container, the cap comprising a lid and a peripheral skirt extending downwardly from the lid, the lid pivotally secured to the skirt; a sifter panel integral with said skirt and separating the skirt into upper and lower sections, the upper section including a measuring chamber and the lower section including means for attaching the cap to the open upper end of the container; and wherein at least the lid is provided with volume indicators; the sifter panel formed to provide a flow opening on one side of a horizontal centerline extending across the cap, the flow opening defined in part by a first edge extending parallel to and spaced from the horizontal centerline; and a rotatable weir dam panel overlying the sifter panel, the weir dam panel having a second edge which may be aligned with the first edge to enable substantially free flow of container contents through the flow opening.

Other objects and advantages of the invention will become apparent from the detailed description which follows.

DETAILED DESCRIPTION OF THE DRAWINGS

Figure 1:
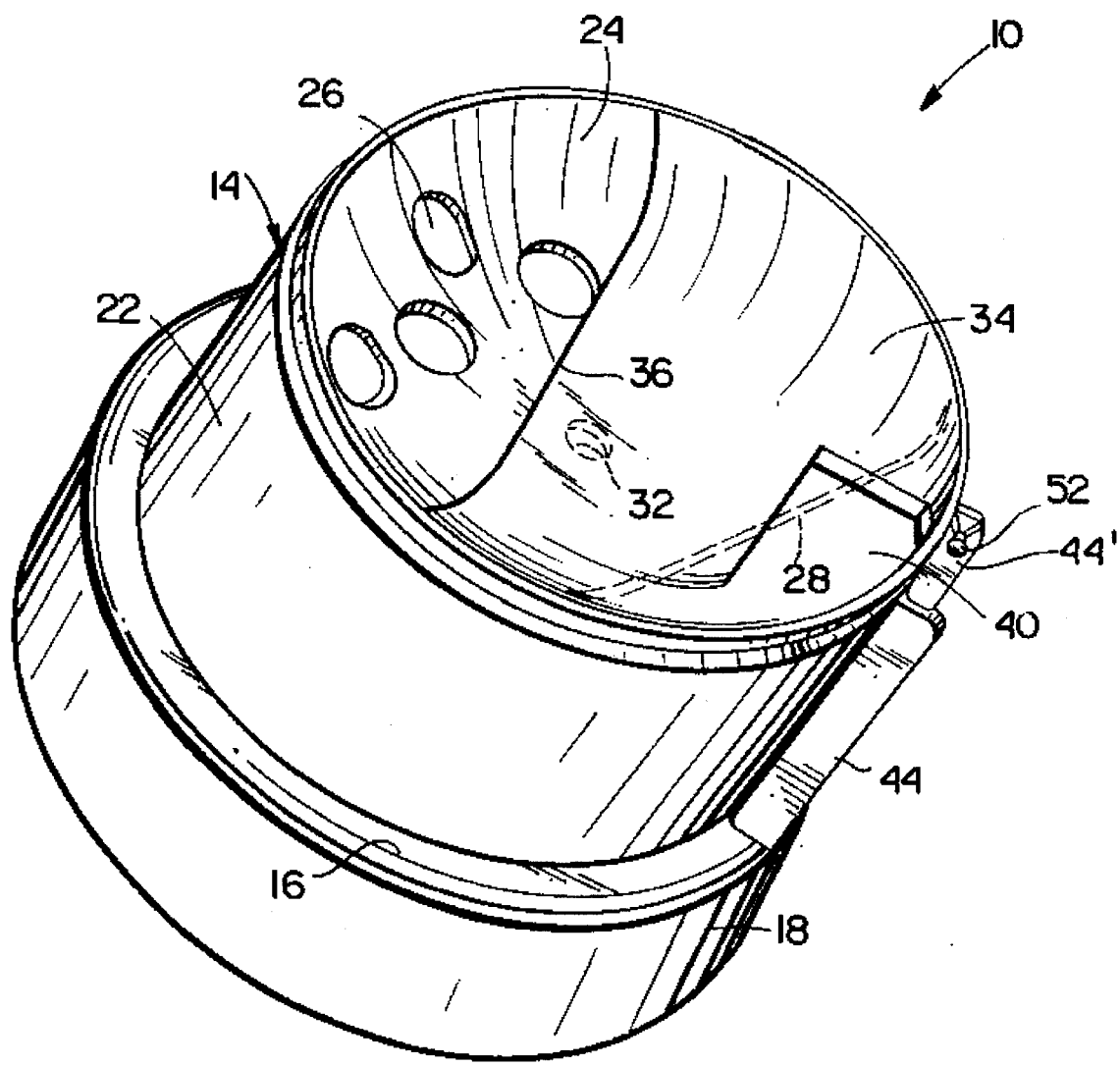
FIG. 1 is a perspective view of the combination dispensing cap sifter in accordance with this invention but with the cap lid removed for clarity.
Figure 2:
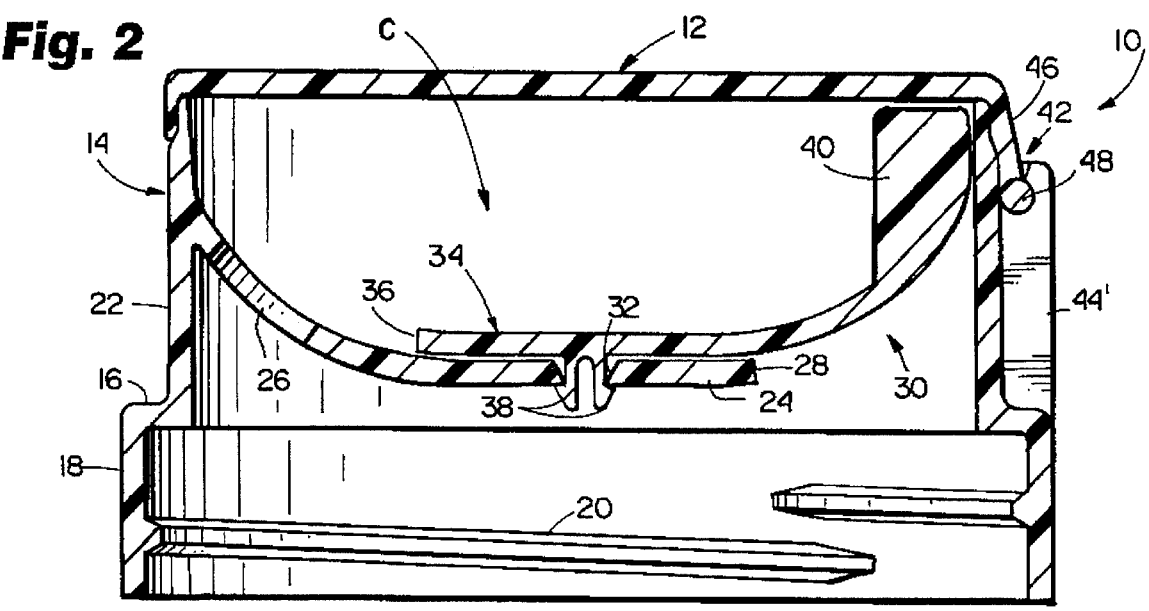
FIG. 2 is a side section of the dispenser/sifter cap in accordance with the invention.

With reference now to FIGS. 1 and 2, the measuring/dispensing cap 10 includes a cap lid 12 (not shown in FIG. 1) and a depending skirt portion 14. The depending skirt portion includes an annular shoulder 16 defining a lower skirt portion 18 having internal screw threads 20 adapted to cooperate with external threads on the upstanding dispensing portion of a container or jar (not shown) in the manner of a typical threaded closure. That portion of the skirt 14 extending upwardly from shoulder 16 will be referred to as the upper skirt portion 22.

The interior of the cap 10 is formed with a partially annular integral sifter panel 24 which is curved in the manner shown in FIG. 2 (and considered to resemble an inverted dome or an upright bowl), and which includes a plurality of sifter apertures 26. The arcuate extent of the sifter panel terminates along a chord or straight edge 28 to thereby define a chord-shaped flow opening 30 defined by the edge 28 in combination with an arcuate portion of the upper peripheral skirt 22. This sifter panel 24 is formed with a centrally located aperture 32 which permits securement of a weir dam panel 34 as described below. Edge 28 lies to one side of a horizontal centerline through the cap (and perpendicular to the vertical center axis of the cap extending through aperture 32).

Figure 4:
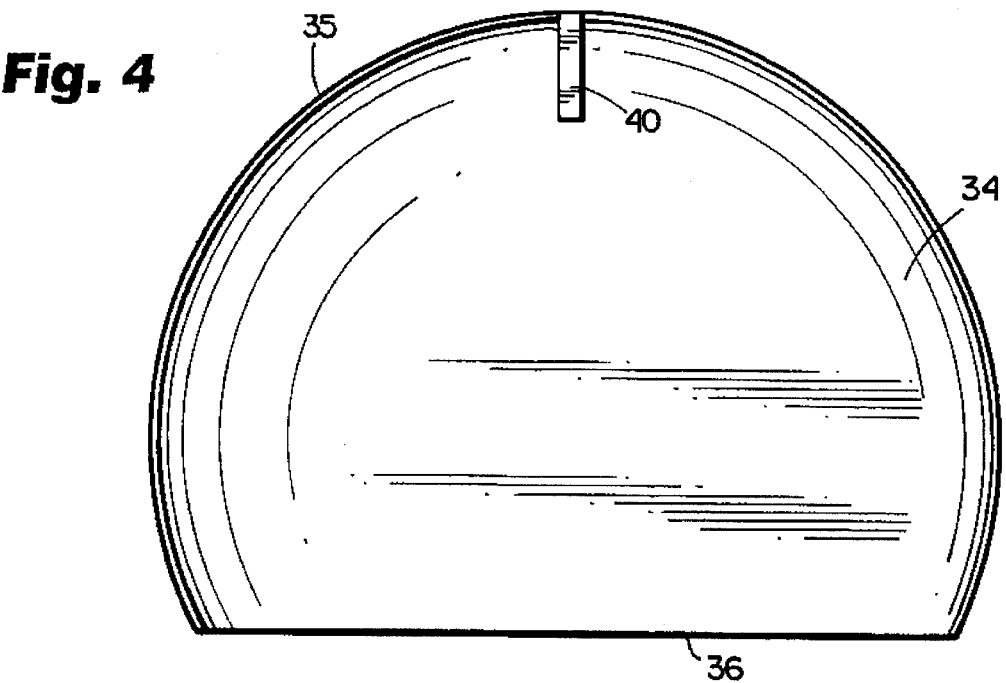
FIG. 4 is a plan view of the weir dam panel utilized in the dispensing/sifter cap of this invention.

The weir dam panel 34, best seen in FIGS. 1, 2 and 4, has a size and arcuate shape similar to that of the sifter panel but does not include any apertures of the type shown at 26, i.e., the weir panel is solid. The weir panel has a curvature similar to the sifter panel and the arcuate extent of the weir dam panel as defined by edge 36 is also similar to the sifter panel in that the chord or straight edge 36 of the weir dam panel creates a second chord-shaped flow opening which may be aligned with the sifter panel flow opening 30 so that the flow similar sized and shaped openings of each are superposed one on the other.

The weir dam panel 34 is also provided with a pair of downwardly projecting spring fingers 38 which, upon lateral compression, will pass through the aperture 32 in the sifter panel and then spring outwardly so that the weir dam panel 34 is rotatably mounted on the sifter panel 34 for rotation about the vertical center axis coincident with a vertical center axis of the cap. The weir dam panel 34 is also provided with an upstanding projection or tab 40 which facilitates user rotation of the weir dam panel within the cap. It will be appreciated that the sifter panel 24 and weir dam panel 34, by reason of their inverted dome-like or bowl-shapes, create along with closed lid 12, a measuring chamber C within the cap 10 into which container contents may be transferred as described in greater detail below.

The lid 12 is secured to the upper portion 22 of the depending skirt portion 14 by means of hinge 42 which is described below in greater detail in connection with FIGS. 2, 3, 5 and 7. The lid is provided with volumetric indicia, or level indicators I (which may include alpha and/or numeric characters) to assist the use in determining the amount of contents transferred to the measuring chamber C.

In the preferred arrangement, the entire cap 10 may be constructed of transparent plastic. It will be appreciated, however, that the skirt portion 14 and/or panels 24 and 34 may be formed of opaque material if desired. In the event the skirt portion 14 is formed of transparent material, the indicia I may be continued onto the skirt.

The lid 12 is secured via the hinge mechanism 42 to the "rear" wall of the cap skirt portion 22. With reference now specifically to FIGS. 3–7, the hinge mechanism 42 is comprised of a pair of laterally spaced reinforcement ribs 44, 44' extending downwardly along the "rear" skirt wall and preferably integral therewith. A second component of the hinge 42 includes a tab 46 extending downwardly from the lid skirt or flange 49 in alignment above and between the reinforcing ribs 44, 44'. Tab 46 is formed with two lateral extending projections 48, 50 of generally spherical shape.

Figure 3:
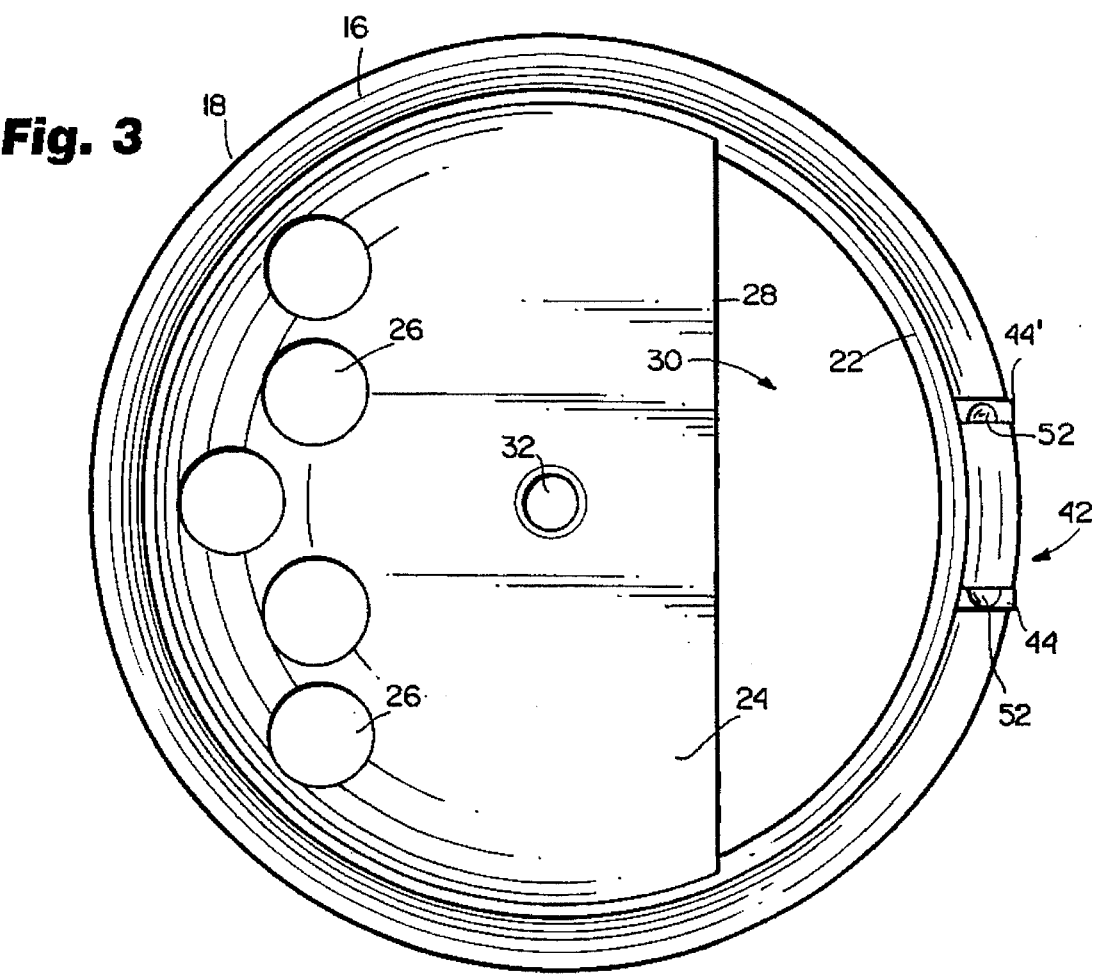
FIG. 3 is a plan view of the dispensing/sifter cap in accordance with the invention but with the cap lid and weir dam panel removed for clarity.
Figure 7:
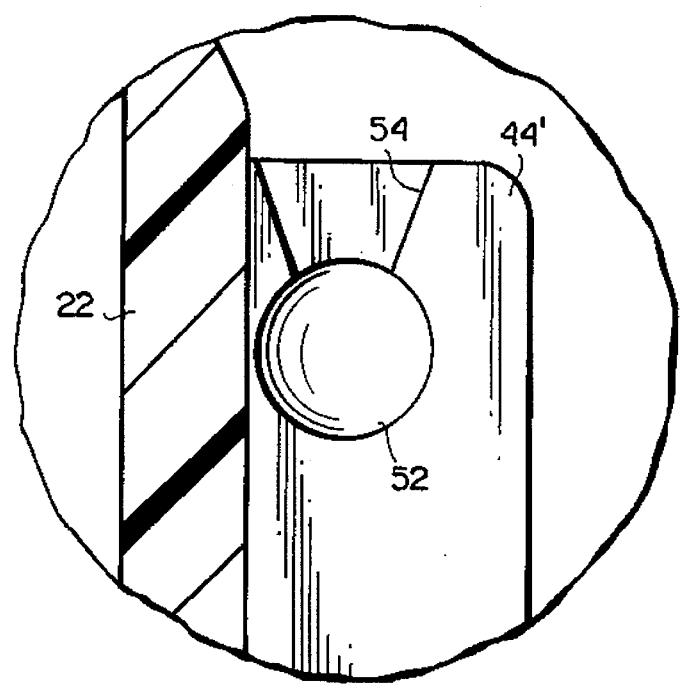
FIG. 7 is a partial side elevation view of the inside wall of a hinge mechanism joining the cap lid to the cap in accordance with the invention.

With specific reference to FIGS. 3 and 7, it may be seen that the inside of reinforcement rib 44' (as well as rib 44) is formed with a generally spherical recess 52 and tapered entry groove 54, and the inside of reinforcement rib 44 is similarly formed. As may be appreciated from FIG. 7, the lateral projections 48, 50 may be snap fit into the spherical recesses 52 in opposed inside surfaces of ribs 44 and 44' with the aid of tapered entry grooves 54 thereby forming a horizontal pivot axis extending between the lateral projections 48, 50. At the same time, the tapered entry grooves 54 define limits of pivotal movement of the lid or door 12 between open and closed positions. It will be appreciated that other hinge arrangements, such as a simple "living" or integral hinge may be employed. In other words, the cap 12 can be secured to a reinforced area of the cap skirt portion 14 by a thinned area which acts as a hinge.

Figure 5:
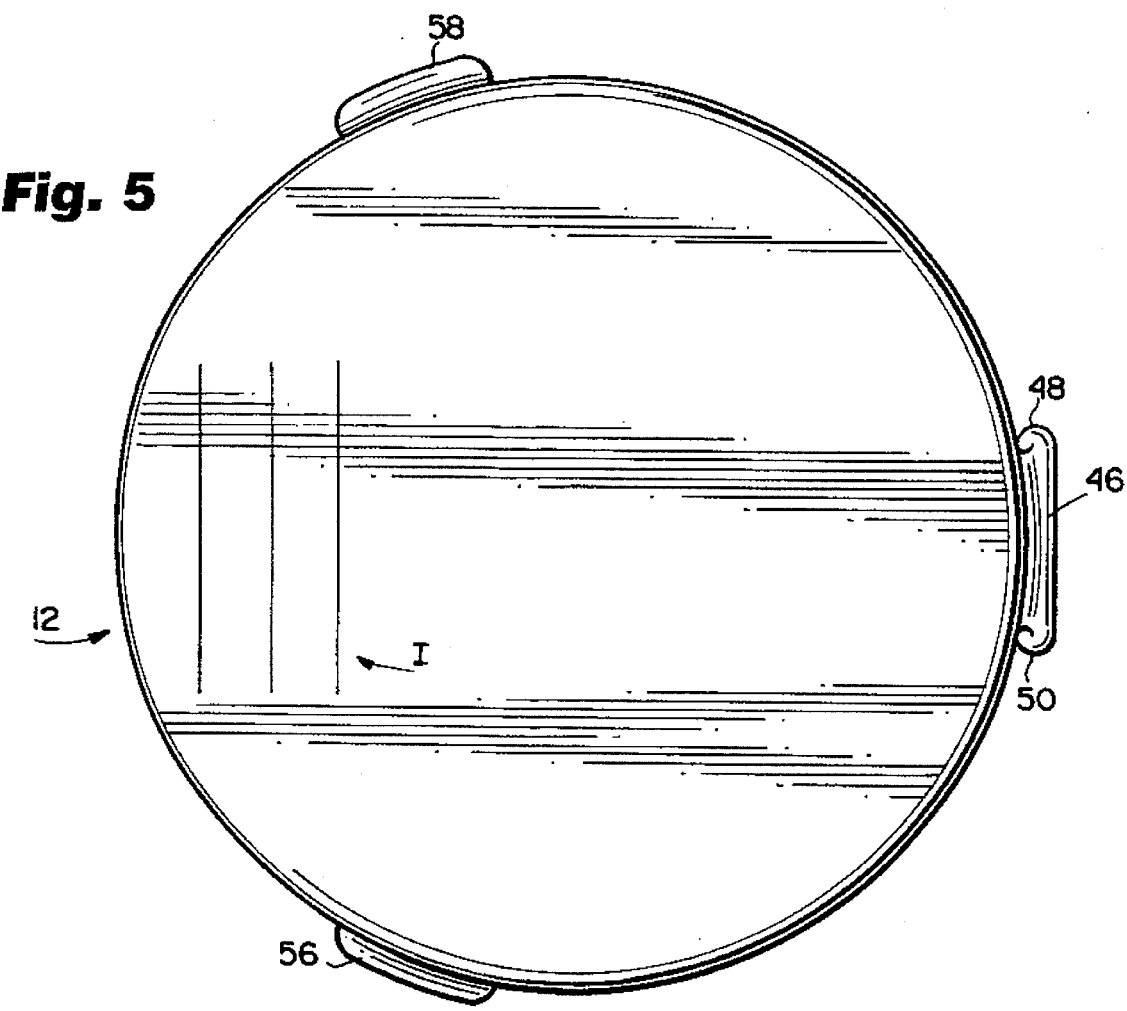
FIG. 5 is a plan view of the cap lid in accordance with the invention.
Figure 6:
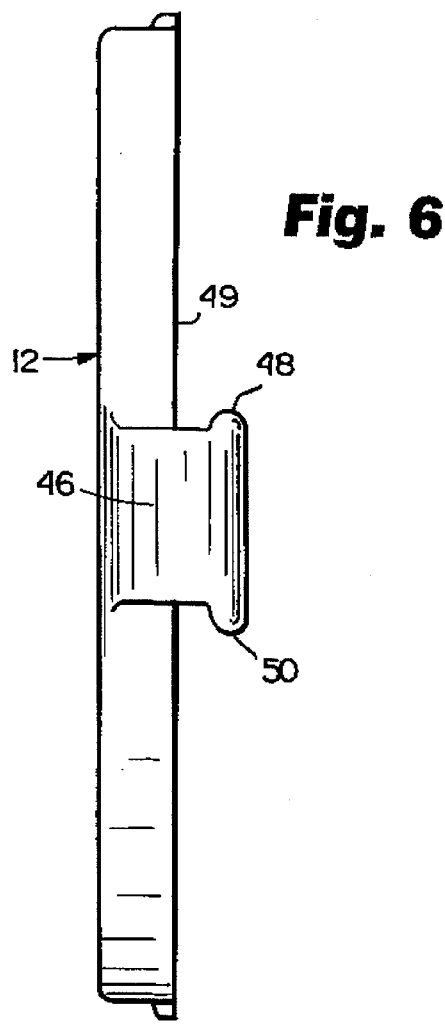
FIG. 6 is an end elevation of the cap lid shown in FIG. 5.

The lid 12 is also formed with a pair of lifting tabs 56, 58, best seen in FIG. 5, to facilitate opening of the lid.

With the weir dam panel 34 in place as shown in FIG. 2, it will be appreciated that the user may rotate the weir dam panel 34 to a first operative position so as to cover the sifter apertures 26 in fixed panel 24, and so that the edges 28 and

36 are aligned thereby permitting container contents to flow freely through the flow opening 30. With the container tilted to, for example, a substantially horizontal orientation, and with the opening 30 located above both the sifter and weir dam panels, contents of the container may be transferred from the container into the measuring chamber C. In this orientation, both the sifter panel 24 and the weir dam panel 34 act as a dam to prevent additional undesired amounts of material from spilling over the aligned edges 28 and 36 and into the measuring chamber C. The lid 12 at this time is closed. Subsequently, the lid 12 may be opened via pivoting movement about the hinge 42 to thereby allow precisely measured amounts of container contents to be dispensed from the cap, sliding along the curved surface of the weir dam panel 34. Alternatively, with the panels in the positions described above, and if the lid 12 is open from the outset, contents may be discharged directly out of the cap via flow opening 30 without regard for amount. On the other hand, the user may rotate the weir panel to a second operative position so that the solid portion thereof blocks the opening 30 but leaves the sifter panel apertures 26 uncovered so that contents within the container may be sprinkled directly from the cap 10 through the open lid 12 without regard to the particular amount dispensed.

Figure 8:
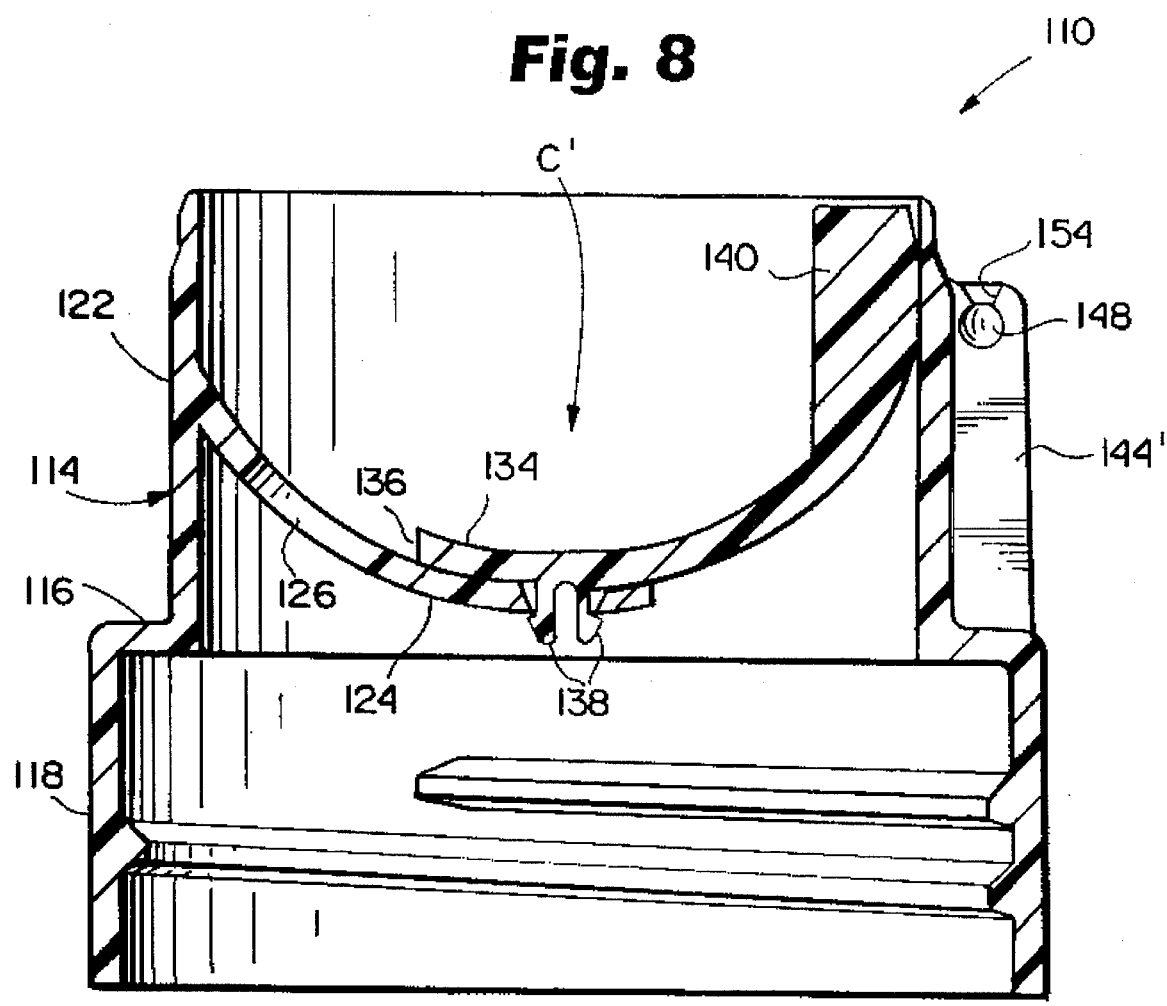
FIG. 8 is a side section similar to FIG. 2 but illustrating a larger capacity cap.

It will be appreciated that the size and shape of both the sifter panel 24 and the weir dam panel 34 and depending skirt 14 may be altered to enlarge or reduce the size of the measuring chamber C. For example, in FIG. 8, an enlarged cap 110 is illustrated, using reference numerals similar to those used in FIGS. 1–7, but with the prefix "1" added, to designate corresponding elements. In this embodiment, the curvature of both the sifter panel 124 and weir dam panel 134 have been increased to provide a measuring chamber C' of greater volume. The construction of the cap 110 as well as the manner in which it may be utilized are otherwise similar to that described above in connection with the first embodiment.

What is claimed is:

1. A measuring/dispensing cap adapted for attachment to an open, upper end of a container, the cap comprising:

a lid and a peripheral skirt extending downwardly from said lid, said lid pivotally secured to said skirt; a sifter panel integral with said skirt and separating said skirt into upper and lower sections, the upper section including a measuring chamber and the lower section including means for attaching said cap to the open upper end of the container; and wherein at least said lid is provided with volume indicators; said sifter panel formed to provide a flow opening on one side of a horizontal centerline extending across said cap, said flow opening defined in part by a first edge extending parallel to and spaced from said horizontal centerline; and a rotatable weir dam panel overlying said sifter panel, said weir dam panel having a second edge which is alignable with said first edge to enable substantially free flow of container contents through said flow opening.

2. The measuring/dispensing cap of claim 1 wherein said weir panel opening is of substantially similar size and shape as said sifter panel opening; and wherein a plurality of sifting apertures are arranged in an array adjacent said flow opening in said sifter panel.

3. The measuring/dispensing cap of claim 2 wherein said weir panel includes a vertical tab extending upwardly within the measuring chamber to thereby enable rotation of the weir panel from a first position where said weir panel overlies said sifter apertures to a second position where said weir panel overlies said flow opening in said sifter panel.

4. The measuring/dispensing cap of claim 1 wherein said lid is formed entirely of transparent plastic material.

5. The measuring/dispensing cap of claim 4 wherein said lid is hinged to said skirt at one side of said cap closest to said sifter panel edge.

6. The measuring/dispensing cap of claim 1 wherein at least said lid is formed of substantially transparent material.

7. The measuring/dispensing cap of claim 1 wherein said weir panel rotatably secured on said stationary sifter panel.

8. The measuring/dispensing cap of claim 7 wherein said weir panel and said sifter panel are substantially similar in size and shape.

9. The measuring dispensing cap of claim 1 wherein said lid pivots about a hinge axis which is parallel to said first and second edges and parallel to said horizontal centerline, said hinge axis on the same side of said horizontal centerline as said flow opening.

10. A measuring/dispensing cap for attachment to an open upper end of a container, the cap comprising:

a peripheral skirt having an integral, partially annular sifter panel formed therein, said sifter panel having a plurality of sifter apertures on one side thereof, wherein said partially arcuate panel terminates at a straight edge to define a first flow opening;

a weir dam panel rotatably fixed on said sifter panel, said weir dam panel having a size and shape similar to said sifter panel but without apertures therein, such that a second opening formed by said weir dam panel can be placed in overlying relationship with said first flow opening of said sifter panel; wherein said sifter panel and said weir dam are formed with respective edges lying on one side of a horizontal centerline through said cap; and a lid pivotally secured to said peripheral skirt about a horizontal pivot axis lying on the same side of said horizontal centerline as said respective edges.

11. The measuring/dispensing cap of claim 10 wherein said sifter panel and said weir dam panel are curved to establish a measuring chamber in an upper portion of said cap between said panels and said lid.

12. The measuring/dispensing cap of claim 11 wherein said weir panel includes a vertical tab extending upwardly within the measuring chamber to thereby enable rotation of the weir panel from a first position where said weir panel overlies said sifter apertures to a second position where said weir panel overlies said flow opening in said sifter panel.

13. The measuring/dispensing cap of claim 10 wherein said lid is formed entirely of transparent plastic material.

14. The measuring/dispensing cap of claim 10 wherein at least said lid is formed of substantially transparent material.

15. A measuring/dispensing cap adapted for attachment to an open, upper end of a container, the cap comprising:

a lid and a peripheral skirt extending downwardly from said lid, said lid secured to said skirt for movement between open and closed positions; a fixed sifter panel surrounded by said skirt and separating said skirt into upper and lower sections; the upper section including a measuring chamber and the lower section including means for attaching said cap to the open upper end of the container; said sifter panel formed to provide a flow opening on one side of a horizontal centerline extending across said cap, said flow opening defined in part by a first edge extending parallel to and spaced from said horizontal centerline; and a rotatable weir dam panel having a second edge defining a weir opening wherein said weir panel is rotatable to a first position blocking said flow opening and to a second position where said second edge is aligned with said first edge to enable substantially free flow of container contents through said flow opening.

* * * * *